US012761392B1

(12) United States Patent
van Steenwyk

(10) Patent No.: US 12,761,392 B1
(45) Date of Patent: Oct. 13, 2026

(54) GYROSCOPIC SURVEY INSTRUMENT AND METHOD

(71) Applicant: Brett van Steenwyk, Bellingham, WA (US)

(72) Inventor: Brett van Steenwyk, Bellingham, WA (US)

(73) Assignee: Brett van Steenwyk, Bellingham, WA (US)

( * ) Notice: Subject to any disclaimer, the term of this patent is extended or adjusted under 35 U.S.C. 154(b) by 351 days.

(21) Appl. No.: 18/442,760

(22) Filed: Feb. 15, 2024

(51) Int. Cl.
*E21B 47/022* (2012.01)
*G01C 19/00* (2013.01)
*G01P 15/18* (2013.01)
*G01V 9/00* (2006.01)

(52) U.S. Cl.
CPC .............. *G01V 9/00* (2013.01); *E21B 47/022* (2013.01); *G01C 19/00* (2013.01); *G01P 15/18* (2013.01)

(58) Field of Classification Search
CPC ..................................................... E21B 47/022
See application file for complete search history.

(56) References Cited

U.S. PATENT DOCUMENTS 4,756,088 A 7/1988 Russell et al.
10,246,988 B2 * 4/2019 Wang .................... E21B 47/022
10,550,686 B2 2/2020 van Steenwyk et al.
2005/0022402 A1 * 2/2005 Ash ....................... E21B 47/022 33/321
2005/0022404 A1 * 2/2005 Ash ...................... G01V 11/002 33/313
2005/0126022 A1 * 6/2005 Hansberry ............ E21B 47/022 33/313
2009/0119937 A1 5/2009 Watson
2014/0366622 A1 * 12/2014 Goetze .................. E21B 47/022 73/152.59
2017/0335676 A1 * 11/2017 Dykstra ................ E21B 47/024
2018/0156027 A1 6/2018 Van Steenwyk et al.

OTHER PUBLICATIONS

International Search Report and Written Opinion dated Aug. 20, 2024, for International Application No. PCT/US2024/023649.
Basic Principles of Inertial Navigation, Seminar on inertial navigation systems Tampere University of Technology, publication date not known.

* cited by examiner

*Primary Examiner* — David Carroll
(74) *Attorney, Agent, or Firm* — Richard A. Fagin

(57) ABSTRACT

A method for gyrocompass surveying a subsurface well according to another aspect of the present disclosure includes moving a gyrocompass sensor to a survey position along the well. The gyrocompass sensor has gyroscopic sensors (gyros) having input axes along three mutually orthogonal directions and accelerometers having input axes along the three mutually orthogonal directions. Output of the gyros and output of the accelerometers is measured. The gyros are rotated such that the input axes are oriented along opposed directions to the three mutually orthogonal directions, wherein a different gyro input axis is oriented along each opposed direction than the gyro input axis oriented along each of the three mutually orthogonal directions. Measuring output of the gyros is repeated, and at least a geodetic azimuth of the gyrocompass sensor is determined using the measured gyro output, the repeated measured gyro output and the measured output of the accelerometers. The azimuth is corrected for gyro bias.

16 Claims, 3 Drawing Sheets

GYROSCOPIC SURVEY INSTRUMENT AND METHOD

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of gyroscopic survey instruments used to measure trajectory of wells drilled through subsurface earthen formations. More particularly, the disclosure relates to gyroscopic survey instruments having improved capability to determine effect of gyroscope drift and reduced time for such instruments to obtain survey data.

Knowledge of wellbore placement and surveying is useful for the development of subsurface oil and gas deposits. Accurate knowledge of the spatial position of a wellbore at certain measured depths, and the wellbore inclination and azimuth (geodetic or geomagnetic direction), collectively, the trajectory of the well, may be used to facilitate directionally drilling the well such that the well reaches a subsurface target spatial position of, for example, an oil bearing formation of interest. Drilling a well to one or more target spatial positions in the subsurface is known as directional well drilling.

Directional well drilling typically relies on one or more directional devices such as bent housing hydraulic drilling motors and rotary steerable directional drilling systems to direct the trajectory of the wellbore. An angle subtended between a reference direction of the directional device (called the toolface) and an external reference direction, e.g., geodetic or geomagnetic North, or gravitational vertical, is referred to as the toolface angle or azimuth. Directional drilling proceeds by comparing the measured trajectory of the well with the planned trajectory, and selecting directional drilling parameters, including toolface angle, to correct the well trajectory toward the planned trajectory. Measurement of the toolface angle thus may be a measurement usable for well steering and placement.

Measurement of inclination (defined as angle of the well longitudinal axis with reference to Earth's gravity direction) and azimuth (defined as the geodetic or geomagnetic direction of the axis of the well) may be used in surveying operations. One method for determining the orientation and spatial position of a wellbore tool in a well with respect to the Earth's rotation vector is to take a gyro survey using an instrument referred to herein as a gyrocompass, to determine toolface angle, inclination, and azimuth. The gyrocompass comprises one or more gyroscopic sensors, referred to herein as gyros, to detect the Earth's rotation and determine the direction of the tool longitudinal axis with reference to true (geodetic) north, called azimuth as explained above. However, at high inclination, i.e., where the gyrocompass tool is nearly horizontal (perpendicular) with respect to Earth's gravity, using only a single-axis gyro so oriented in a well may make it difficult to determine true north to sufficient accuracy. Additionally, errors in gyro measurement caused by, for example and without limitation, bias errors or mass unbalance, may be undetected and induce error in the determination of true north and thus the well azimuth.

The determination of orientation, position, inclination, and azimuth of the gyrocompass tool may include determining a gravity toolface or magnetic toolface by using one or more accelerometers or magnetometers, respectively. Accelerometers may be used to detect the local gravity field, typically dominated by the Earth's gravity, to determine the direction of the well tool with reference to vertical. This direction may be used as a reference direction for a gravity toolface. i.e., the direction of the reference on the tool with respect to Earth's gravity. Magnetometers may be used to detect direction of the local magnetic field, typically dominated by the Earth's magnetic field, to determine the tool direction with reference to magnetic north. The direction of magnetic North may be used as the reference direction for a magnetic toolface. However, errors in the sensor readings, such as offset or drift, may be undetected and induce error in the determination of toolface. Particularly when magnetometers are used, deviation of the Earth's magnetic field direction with respect to the direction of true (geodetic) North, and plunge of the Earth's magnetic field close to the Earth's magnetic poles may induce substantial error in determining geodetic trajectory of a well.

Typically, gravity toolface is used except where the inclination is very low, such as, for example and without limitation, 5° or less. In low inclinations, cross-axial accelerometers may measure only a small gravity signal. At low inclinations, gyro or magnetic toolface is ordinarily used for orienting the well toward the target drilling direction due to the large cross-axial signal of the Earth's spin vector or magnetic field.

SUMMARY

One aspect of the present disclosure is a gyrocompass platform for surveying subsurface wells. A gyrocompass platform according to this aspect of the disclosure incudes a frame rotatably mounted in a first gimbal. The first gimbal is disposed in a housing adapted to traverse a subsurface well, an axis of rotation of the frame being parallel to a longitudinal axis of the housing. A motor is arranged for rotating the frame. At least a first rocker gimbal is rotatably mounted in the frame. A motor is arranged for rotating the at least a first rocker gimbal. Gyroscopic sensors (gyros) are mounted to the frame and to the at least one rocker gimbal, the gyros arranged to have input axes along each of three orthogonal directions. The frame and the at least a first rocker gimbal are rotatable to reorient the input axes along opposed directions to the three orthogonal directions wherein a different gyro is oriented along each opposed direction than a one of the gyros oriented along each orthogonal direction. At least one accelerometer is associated with one of the gyros for each orthogonal direction mounted to the frame and the at least one rocker gimbal.

In some embodiments, the gyros comprise three single input axis gyros: a first gyro mounted to the frame; a second gyro mounted to the at least a first rocker gimbal and a third gyro mounted to a second rocker gimbal mounted in the frame and having a motor for rotating the second rocker gimbal. The first and second rocker gimbals have a rotation axis in a plane of the frame and perpendicular to the axis of rotation of the frame.

In some embodiments, the at least a first rocker gimbal and the second rocker gimbal are rotatable between a first position in a plane of the frame and a second position perpendicular to a plane of the frame.

In some embodiments, the gyros comprise three single input axis gyros: a first gyro mounted to the frame; a second gyro mounted to the at least a first rocker gimbal and a third gyro mounted to a second rocker gimbal mounted in the frame and having a motor for rotating the second rocker gimbal. The at least a first and second rocker gimbals have a rotation axis in a plane of the frame and at an angle of 45 degrees to the axis of rotation of the frame.

In some embodiments, the at least a first rocker gimbal and the second rocker gimbal are rotatable between a first position in a plane of the frame and a second position 180 degrees apart from the first position.

In some embodiments, the gyros comprise one single input axis gyro and one dual input axis gyro, the single input axis gyro mounted to the frame and the dual input axis gyro mounted to the at least a first rocker gimbal.

In some embodiments, the single input axis gyro is mounted in the at least a first rocker gimbal and the dual input axis gyro is mounted in a second rocker gimbal mounted in the frame and having a motor for rotating the second rocker gimbal.

In some embodiments, an axis of rotation of the at least a first rocker gimbal and the second rocker gimbal are oriented at an angle of 45 degrees to the axis of rotation.

In some embodiments, the at least a first rocker gimbal and the second rocker gimbal are rotatable between a first position in a plane of the frame and a second position 180 degrees apart from the first position.

Some embodiments further comprise four additional accelerometers mounted to the frame in left-right-up-down configuration, wherein measurements from the four additional accelerometers are used either or both to correct measurements from the gyros for angular acceleration in the platform, and to stabilize the platform.

A method for gyrocompass surveying a subsurface well according to another aspect of the present disclosure includes moving a gyrocompass sensor to a survey position along the well. The gyrocompass sensor has gyroscopic sensors (gyros) having input axes along three mutually orthogonal directions and accelerometers having input axes along the three mutually orthogonal directions. Output of the gyros and output of the accelerometers is measured. The gyros are rotated such that the input axes are oriented along opposed directions to the three mutually orthogonal directions, wherein a different gyro input axis is oriented along each opposed direction than the gyro input axis oriented along each of the three mutually orthogonal directions. Measuring output of the gyros is repeated, and at least a geodetic azimuth of the gyrocompass sensor is determined using the measured gyro output, the repeated measured gyro output and the measured output of the accelerometers. The azimuth is corrected for gyro bias.

In some embodiments, the gyros comprise three single input axis gyros, a first gyro mounted to a frame rotatably supported in a housing, a second gyro mounted to at least a first rocker gimbal mounted in the frame and having a motor for rotating the at least a first gimbal, and a third gyro mounted to a second rocker gimbal mounted in the frame and having a motor for rotating the second rocker gimbal. The first and second rocker gimbals have a rotation axis in a plane of the frame and perpendicular to the axis of rotation of the frame, and wherein the rotating the gyros comprises rotating each of the frame, the at least a first rocker gimbal and the second rocker gimbal by 90 degrees.

In some embodiments, the at least a first rocker gimbal and the second rocker gimbal are rotatable between a first position in a plane of the frame and a second position perpendicular to a plane of the frame.

In some embodiments, the gyros comprise three single input axis gyros, a first gyro mounted to a frame rotatably supported in a housing, a second gyro mounted to at least a first rocker gimbal mounted in the frame and having a motor for rotating the at least a first gimbal, and a third gyro mounted to a second rocker gimbal mounted in the frame and having a motor for rotating the second rocker gimbal. The first and second rocker gimbals have a rotation axis in a plane of the frame. The at least a first and second rocker gimbals have a rotation axis in a plane of the frame and at an angle of 45 degrees to an axis of rotation of the frame and wherein the rotating comprises rotating each of the at least a first rocker gimbal and the second rocker gimbal by 180 degrees.

In some embodiments, the gyros comprise one single input axis gyro and one dual input axis gyro, the single input axis gyro mounted to the frame and the dual input axis gyro mounted to the at least a first rocker gimbal.

In some embodiments, the single input axis gyro is mounted in the at least a first rocker gimbal and the dual input axis gyro is mounted in a second rocker gimbal mounted in the frame and having a motor for rotating the second rocker gimbal.

Some embodiments further comprise measuring acceleration in a frame mounted to an instrument housing, the measuring acceleration performed in in left-right-up-down configuration, wherein measurements of acceleration in the frame are used to correct measurements from the gyros for angular acceleration in the platform.

A method for drift tuning a gyroscopic survey instrument according to another aspect of the present disclosure includes measuring output of gyroscopic sensors and accelerometers in the instrument as the instrument is moved along a wellbore. An attitude of the instrument is determined as the instrument is moved along the wellbore. The instrument is stopped in the wellbore. A platform comprising the gyroscopic sensors and accelerometers in the instrument is determined to have stopped moving. Output of the gyroscopic sensors is measured to determine bias therein. The gyroscopic sensors are reoriented. Output of the gyroscopic sensors is again measured to determine bias. Moving the instrument along the well and determining the attitude are resumed using at least the determined bias after the reorienting.

In some embodiments, the determining the platform has stopped moving comprises measuring angular acceleration of the platform.

In some embodiments, the determining the platform has stopped moving comprises stopping motion of a motor used to rotate a frame in the platform about a longitudinal axis of the instrument.

Other aspects and possible advantages will be apparent from the description and claims that follow.

DETAILED DESCRIPTION

The following description relates to a sensor platform that comprises one or more gyroscopic sensors. The platform may be disposed in or proximate to any device, e.g., a well instrument, that is capable of traversing a subsurface well, including without limitation, wireline conveyed instruments, slickline conveyed instruments, coiled tubing conveyed instruments and jointed tubing conveyed instruments (i.e., measurement while drilling instruments). Such device may be referred to as a survey instrument or wellbore instrument as the context provides. The platform may be disposed in a pressure resistant housing to enable the components associated with the platform to withstand the environment in the well. Such housing may be separate or form part of the well instrument. Signals measured by various sensors on the platform may be communicated to the surface and/or may be stored within recording devices in the wellbore instrument for later interrogation. Electrical power to operate the various components on the platform may be provided, e.g., by batteries, by communication over electrical cable or by a generator associated with the survey instrument. All of the foregoing are within the scope of the present disclosure. The description following omits details of the instrument or its conveyance along a well for clarity and convenience. Those skilled in the art will readily understand how the described sensor platform may be moved along a well and operated in general, and how it may be disposed within various devices for such movement.

Figure 1:
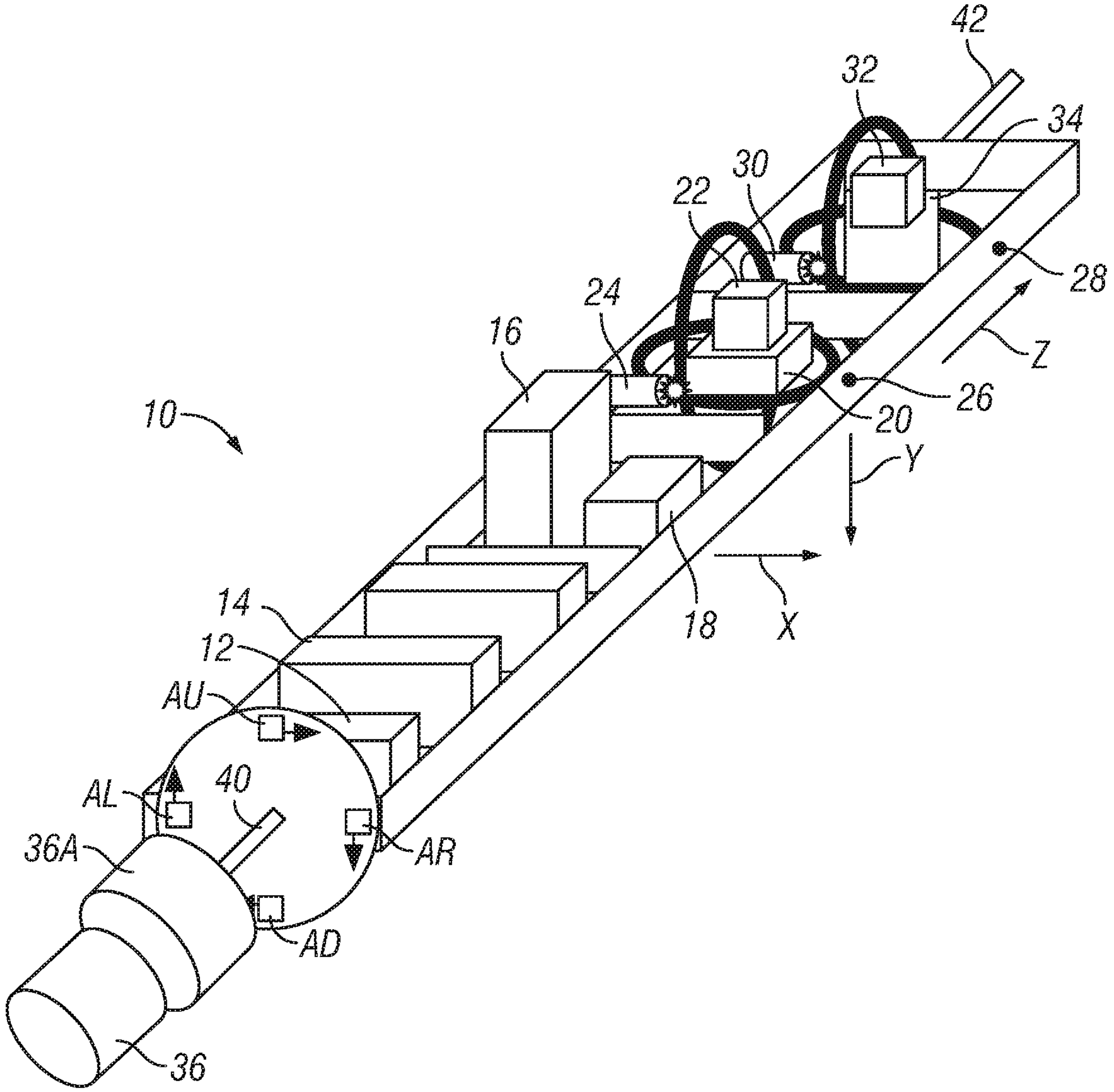
FIG. 1 shows an example embodiment of a gyroscopic sensor platform according to the present disclosure.

An example embodiment of a gyroscopic sensor platform ("platform") is shown generally at 10 in FIG. 1. The platform 10 may comprise a gimbal-mounted frame 12 that is rotatable about an axis of rotation 40 that in some embodiments may be generally parallel to a longitudinal axis 42 of a wellbore instrument (not shown separately) within which the platform 10 may be mounted or associated. The frame 12 may be rotationally coupled to a rotary output of a motor 36. The motor 36 may be a rotary motor, such as a DC or AC electric motor, a stepper motor, a servo motor or any other device that can impart rotary motion to the frame 12 in a controlled manner. In some embodiments, the motor 36 may comprise or have associated therewith a rotary orientation sensor 36A, e.g., an optical rotary encoder or toothed magnetic wheel and wire coil pickup, to determine the rotary orientation and/or amount of rotation imparted to the frame 12 by the motor 36. In some embodiments, the motor 36 may enable the frame 12 to rotate freely when the motor 36 is not activated. In some embodiments, the frame 12 may be weighted such that it tends to remain in a horizontal orientation absent operation of the motor 36.

The frame 12 may have mounted thereto in fixed position a first gyroscopic sensor ("gyro") 16 having an input axis perpendicular to the axis of rotation 40, which input axis may define an X-axis in a coordinate system defined by the frame 12 within a wellbore instrument. A first accelerometer 18 may be fixedly mounted to the frame 12 such that its input axis is parallel to or coaxial with the input axis of the first gyro 16.

A first so called "rocker" gimbal 26 may be rotatably mounted within the frame 12 so as to enable rotation of the first rocker gimbal 26 about an axis parallel to the X-axis, in the present example embodiment being parallel to the plane of the frame 12 and perpendicular to the axis of rotation 40. The first rocker gimbal 26 may have mounted thereon a second gyro 20 oriented such that its input axis is perpendicular to both the X-axis (input axis of the first gyro 16 and first accelerometer 18) and to the axis of rotation 40 when the first rocker gimbal 26 is in a first rotational position, as shown in FIG. 1. Such orientation of the second gyro 20 may be identified as being along the Y-axis in the platform 10 coordinate system. The first rocker gimbal 26 may be rotated by a motor 24 such as a stepper motor, AC or DC electric motor, servo or any other device that can impart rotation to the first rocker gimbal 26. The motor 24, or the first rocker gimbal 26 may be rotationally locked when the motor 24 is not activated, such that the first rocker gimbal 26 is rotationally locked in the position shown in FIG. 1. The motor 24 may include any form of rotation stop, e.g., a fixed stop or a motor rotation limit programmed in the device (e.g., electronics 14 in FIG. 1) such that the first rocker gimbal 26 may be rotated ¼ turn or 90 degrees from the position shown in FIG. 1 and is stopped from further rotation when such ¼ turn movement is obtained. The first rocker gimbal 26 may also have fixedly mounted thereon a second accelerometer 22 oriented such that its input axis is parallel to or coaxial with the input axis of the second gyro 20. When the first rocker gimbal 26 is rotated ¼ turn from the position shown in FIG. 1, the input axes of the second gyro 20 and the second accelerometer 22 become oriented to be parallel to the axis of rotation 40, which may be referred to as the Z-axis in the coordinate system of the platform 10.

A second rocker gimbal 28 may be rotatably mounted to the frame 12 in a manner similar to the first rocker gimbal 26, wherein a motor 30 may serve to rotate the second rocker gimbal from the position shown in FIG. 1 by ¼ turn, in a manner similar to that of the first rocker gimbal 26. A third gyro 34 is mounted to the second rocker gimbal 28 such that its input axis is parallel to the Z-axis in the position shown in FIG. 1. A third accelerometer 32 may be mounted to the second rocker gimbal 28 such that its input axis is parallel to or coaxial with the input axis of the third gyro 34. When the motor 30 operates to rotate the second rocker gyro 28 by ¼ turn, the input axes of the third gyro 34 and third accelerometer 32 are oriented to be parallel to the Y-axis.

Power to operate the gyros 16, 20, 34 and the accelerometers 18, 22, 32 may, in some embodiments, be provided by electronics 14 mounted on the frame. In some embodiments, the electronics 14 may detect signals from the gyros 16, 20, 34 and the accelerometers 18, 22, 32 and process such signals for either or both calculating azimuth and inclination of the well tool (and thereby the well) and sending such signals to a remote location, e.g., the Earth's surface, for further processing.

During operation of the well instrument in a subsurface well, the instrument (not shown separately) may be stopped at a selected survey position along the well. Measurements of the gyros 16, 20, 34 and the accelerometers 18, 22, 32 may be made after a selected time to allow the gyros 16, 20, 34 and the accelerometers 18, 22, 32 to stabilize. Measurements made with the platform 10 arranged as shown in FIG. 1 will result in gyro measurements along three separate axes, abbreviated here as Gx, Gyz and Gzy for convenience and acceleration measurements along the same three separate axes, abbreviated here as Ax, Ayz, Azy for convenience. The subscripts yz and zy indicate that the respective sensor may be oriented along the Y-axis or the Z-axis depending on the rotary positions of the rocker gimbals and the frame relative to initial positions when the well instrument is stopped to take a survey point.

In some embodiments, the frame 12 may be rotated ¼ turn (90 degrees) by the motor 36 such that the first gyro 16 and first accelerometer 18 are oriented such that their input axes are now along the Y-axis. Then, the motor 24 may rotate the first rocker gimbal 26 by ¼ turn so that the input axes of the second gyro 26 and the second accelerometer are oriented along the Z-axis (axis of rotation). Further, the motor 30 may rotate the second rocker gimbal 28 may be rotated ¼ turn so that the input axis of the third gyro 34 and the third accelerometer 32 are oriented along the Y-axis. Measurements may be made at that time by all the accelerometers and gyros.

In the present example embodiment, the accelerometer outputs may be used to calculate inclination and high side (gravity) toolface. The six gyro measurement values (shown as GO in the set of equations below) may be used to compute the components of Earth's rate along the three principal well tool [X, Y, Z] axes as well as gyro biases, either in advance of or parallel to computing well tool azimuth from the Earth rate components. Assuming a perfect platform mechanism with no gyro or accelerometer misalignments, equations to solve for the Earth rate components [ERx, ERy, ERz] and the gyro biases [GbiasX, GbiasYZ, GbiasZY]) may be represented as follows, in which the subscript α represents measurements made with the frame 12 and rocker gimbals 26, 28 in the first position and the subscript § represents measurements made with the frame 12 and the rocker gimbals 26, 28 rotated ¼ turn as explained above:

$$GOx\alpha = ERx + 0 + 0 + G_{biasX} + 0 + 0$$

$$GOyz\alpha = 0 - ERy + 0 + 0 + G_{biasYZ} + 0$$

$$GOzy\alpha = 0 + 0 + ERz + 0 + 0 + G_{biasZY}$$

$$GOx\beta = 0 + ERy + 0 + G_{biasX} + 0 + 0$$

$$GOyz\beta = 0 + 0 - ERz + 0 + G_{biasYZ} + 0$$

$$GOzy\beta = -ERx + 0 + 0 + 0 + 0 + G_{biasZY}$$

The values [GOxα, GOyzα, GOzyα, GOxβ, GOyzβ, GOzyβ] are the measured values of the outputs of the gyros Gx, Gyz, and Gzy in the α and β positions, respectively, as explained above. The above system of equations may be solved for the Earth rate components wherein the gyro biases ($G_{biasX}$, $G_{biasYZ}$, and $G_{biasZY}$) have been canceled. The Earth rate component values may be determined to calculate the well instrument azimuth (Az) using, e.g., the following expressions wherein the horizontal and vertical components of the Earth rates ($ER_H$, $ER_V$) are known from the geodetic latitude of the well:

$$ERx = (ER_H\cos(Az)\cos(I) + ER_V\sin(I))\cos(HTF) - ER_H\sin(Az)\sin(HTF)$$

$$ERy = -ER_H\sin(Az)\cos(HTF) - (ER_H\cos(Az)\cos(I) + ER_V\sin(I))\sin(HTF)$$

$$ERz = ER_H\cos(Az)\sin(I) - ER_V\cos(I)$$

Azimuth may be solved using the foregoing expressions, wherein inclination (I), the angle subtended by the well tool longitudinal axis with reference to vertical, and high side (gravity) tool face (HTF), the angle subtended by the well tool longitudinal axis with reference to geodetic North, are obtained from the accelerometer measurements.

Figure 2:
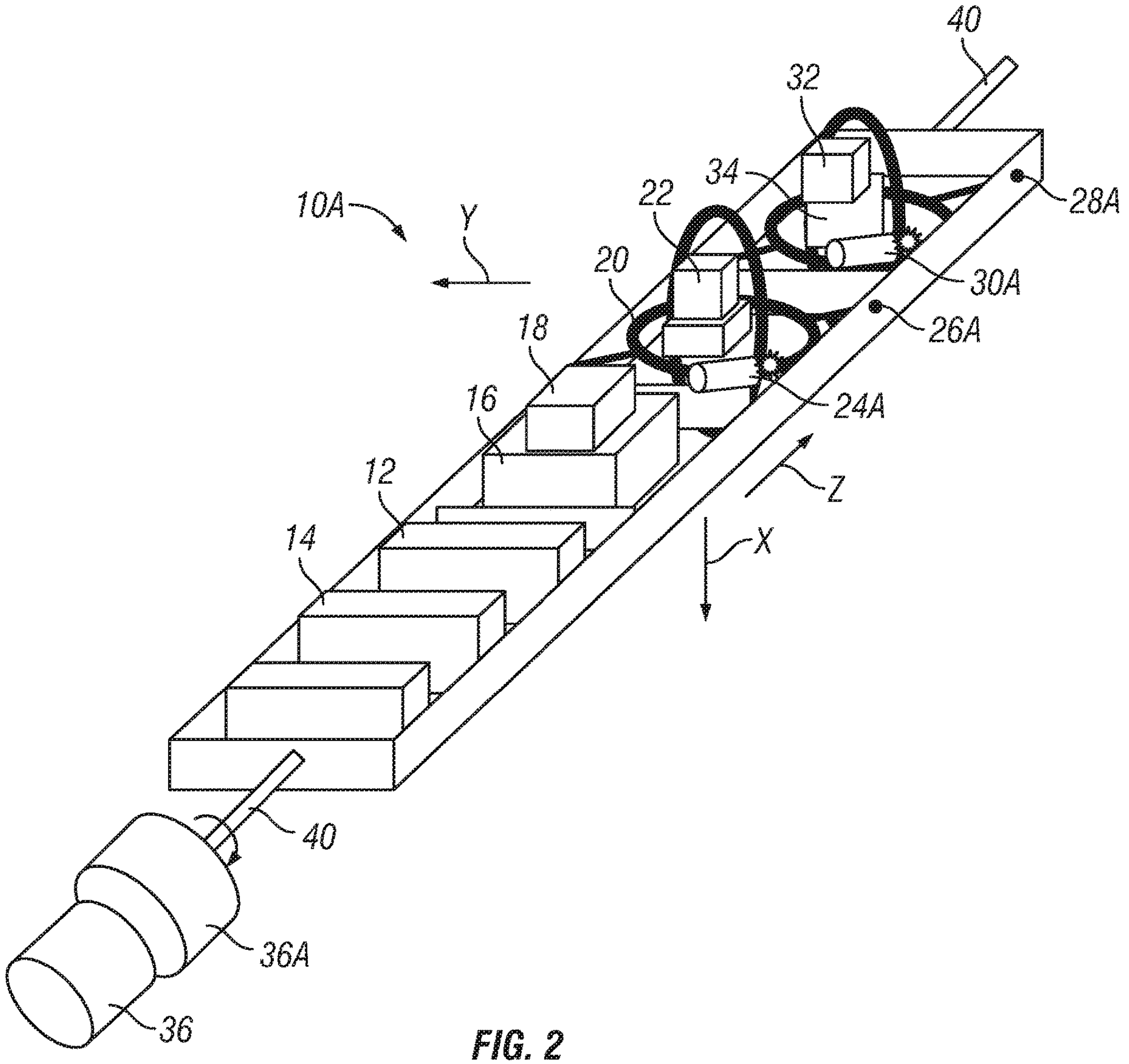
FIG. 2 shows another example embodiment of a sensor platform according to the present disclosure.

In some embodiments, and referring to FIG. 2, the first and second rocker gimbals 26A, 28A are mounted within the frame 12 so as to rotate about axes that are nominally oriented at 45° to the main axis in the Y-Z plane (in the present example embodiment, the plane defined by the frame 12), and are parallel to one another. Each gyro and accelerometer input axis may be nominally perpendicular to the other two input axes, typically along each principal axis. Each rocker gimbal 26A, 28A may be rotated by a respective motor 24A, 30A which may be similar in type and/or structure to the rocker gimbal motors explained with reference to FIG. 1, and wherein each such motor 24A, 30A and any accompanying structure such as hard rotation stops, provides the respective rocker gimbal 26A, 28A the capability of rotating from the orientation shown in FIG. 2 by 180 degrees or ½ turn.

The first gyro 16 and its accompanying first accelerometer 18 (Gx, Ax) are mounted on the frame 12, with their respective input axes perpendicular to the axis of rotation 40, to define the X-axis. The second gyro 20 and accompanying second accelerometer 22 (Gyz, Ayz) are mounted inside the first rocker gimbal 26A, and in the "reference" as shown in FIG. 2 their input axes will be aligned with the cross-axis direction −Y. When the first rocker gimbal 26A is rotated ½ turn the input axis of the second gyro 20 will be in the −Z direction.

The third gyro 34 and accompanying accelerometer 32 (Gzy, Azy), are mounted in the second rocker gimbal 28A, and when the second rocker gimbal is in the "reference" orientation shown in FIG. 2, will have their input axes aligned with the Z-axis, i.e., the axis of rotation 40. When the second rocker gimbal 28A is rotated ½ turn or 180 degrees, the third gyro's 34 input axis will be oriented in the Y-axis direction.

In a method according to the present disclosure using the embodiment described above with reference to FIG. 2, at one or more selected survey depths in a well, the well instrument is stopped and the gyros and accelerometers described above are allowed to stabilize. Then measurements from the gyros and accelerometers are made with the frame 12 and rocker gimbals 26A, 28A in the positions shown in FIG. 2. When the frame 12 and the first and second rocker gimbals are in the positions shown in FIG. 2, the respective first, second and third gyros (and associated accelerometers) measure Earth rate components in the X, Y and Z axis directions.

After the foregoing measurements are made, the frame 12 is rotated ¼ turn (90 degrees) as explained with reference to FIG. 1, and the first 26A and second 28A rocker gimbals are rotated ½ turn (180 degrees).

If the gyro input axis is oriented in the −Y direction in the initial state, after rotation of the frame and the rocker gimbals, the gyro input axis will move to the −Z direction. If the initial gyro input axis is oriented in the −Z direction, it will move to the −Y direction.

If the gyro input axis is initially oriented in the Z direction it will move to the −X direction after rotation of the frame and the rocker gimbals. If the initial orientation of the gyro input axis is in the −X direction, it will move to the Z direction after rotation of the frame and the rocker gimbals.

The foregoing arrangement of gyros as shown in FIG. 2 and the above described frame and rocker gimbals will provide a set of six gyro measurements in the same way as explained with reference to FIG. 1. The earth rate components and tool azimuth may be determined in substantially the same way as explained with reference to FIG. 1. Thus, in an apparatus and method according to the present disclosure, three orthogonal gyros and associated accelerometers may be reoriented from an initial orientation by rotation of a first gimbal and associated gyro and accelerometer, and rotation of second and third gimbals mounted rotatably on the first gimbal, each with associated gyros and accelerometers, such that the reoriented gyros provide Earth rate component measurements that enable canceling or solving for gyro bias. Such bias-canceled or bias-solved Earth rate components may be used to determine well instrument geodetic azimuth at any one or more survey positions along a well.

In some embodiments, the gyros may comprise one single input axis gyro and one dual input axis gyro. The dual input axis gyro may comprise two, orthogonal input axes. Each input axis of the single and dual axis gyros is nominally perpendicular to the other two input axes, typically along each principal axis. In one embodiment, a single axis gyro may be designated Gzy, wherein the single axis gyro Gzy, is mounted in the first rocker gimbal (26 in FIG. 1), and when the frame and first rocker gimbal are oriented such as shown in FIG. 1 will be aligned with the −Y direction. The two axis gyro will be mounted in the second rocker gimbal, with one input axis aligned to the X direction (parallel to the second rocker gimbal axis). The second input axis will be oriented along the Z direction (along the tool longitudinal axis.

Some embodiments may comprise one single axis gyro and one dual axis gyro. Each input axis of the single and dual axis gyros is nominally perpendicular to the other two input axes, typically along each principal axis. The single axis gyro may be designated Gyz and may be is mounted inside the first rocker gimbal, and in the orientation shown in FIG. 1 will be aligned with the Z direction The two axis gyro will be mounted in the second rocker gimbal, with one input axis aligned with the X direction (parallel to the rocker gimbal axis). The second input axis of the dual axis gyro will be pointed, in the frame and rocker gimbal arrangement shown in FIG. 1, along the −Y direction.

In some embodiments, dual axis gyros may be used, and in some such embodiments may eliminate the need for the second rocker gimbal (e.g., 28 in FIG. 1). An example of such embodiments may comprise a single-axis gyro and a dual-axis gyro. In some embodiments, there may be only one rocker gimbal, having a rotation axis at 45° to the Z axis in the Y-Z plane, e.g., as shown in FIG. 2. Each input axis of each of the single and dual axis gyros is nominally perpendicular to the other two input axes, typically along each principal axis. Gyro Gx is a single-axis gyro, mounted on the frame, with its input axis perpendicular to the axis of rotation 40. It is in the nominal X direction in the orientations shown in FIG. 2. The dual-axis gyro, which may be designated Gyzzy, is mounted inside the (only) rocker gimbal, and in the orientation shown in FIG. 2, the first input axis will be aligned with the −Y direction and the second input axis is aligned with the Z direction. When the rocker gimbal is rotated ½ turn (180 degrees) will move the first input axis will be reoriented into the −Z direction, while the second input axis will be reoriented into the Y direction, when the frame remains in the original orientation.

In some embodiments, conventional, more accurate "long" form gyrocompassing is also possible, combining a known gyrocompassing method with the foregoing example methods that enable gyro bias correction. In one example embodiment, the following may be performed. The well instrument may be stopped at a selected survey depth. Once the sensors have had an opportunity to stabilize, the platform (either as 10 in FIG. 1 with mounted electronics or otherwise) will sample of the outputs of the gyros and accelerometers. Frame may then be rotated ½ turn (180°), the sensor outputs will be allowed to stabilize, and another sample of sensor outputs will be made. The system may then make measurements as explained with reference to FIG. 1, wherein the frame is rotated ¼ turn from its initial position, and the rocker gimbals are rotated ¼ turn from their initial positions. In this way, a first set of measurements may be made that provide correction for gyro bias. It will be apparent to those skilled in the art that the bias correcting measurements may be made using any other embodiment that provides orthogonal gyro measurements in opposed directions from different gyros as explained herein. After settling the outputs, a third group of sensor samples will be obtained. Finally, the frame will be rotated another 180°, the sensors allowed to settle, and a fourth sample set obtained The result is a pair of conventional gyrocompass measurement sets paired with bias corrected gyro measurements as explained above.

In some embodiments, and referring again to FIG. 1, a set of four additional accelerometers may be mounted on the frame 12 in what is known as an "up-down-right-left" configuration. These are shown in FIG. 1 at AD, AL, AU and AR. The four accelerometers may be mounted, e.g., near or on the perimeter of the frame 12 and may be in addition to the accelerometers used for inclination determination explained with reference to FIG. 1 and FIG. 2. The arrangement of four accelerometers may be used to provide angular acceleration (high frequency) information relevant to the stability of the frame 12 during a survey measurement. The "up" AU and "down" AD accelerometers may be mounted such that their input axes are oriented be right and left, respectively viewed in the down direction with reference to the well). The "left" AL and "right" AR accelerometers may be mounted such that their input axes would be up and down, respectively in the reference coordinate system of the platform 10. The scales and thermal dependencies of the accelerometers are preferably well matched so that the "common mode" of their outputs contains less than one part per thousand of linear acceleration. The differential mode of the left and right accelerometers AL, AR may provide a linear acceleration in the X direction, while the differential of the up and down accelerometers AU, AD may provide linear acceleration in the Y direction, both with reference to the plane of the frame as explained with reference to FIG. 1. The forgoing accelerometer is described, for example, in, Padgaonkar, A. J., Krieger, K. W., and King, A. I., Measurement of Angular Acceleration of a Rigid Body Using Linear Accelerometers, ASME J. Appl. Mech., 42, pp. 552-556 (1975). The foregoing structure of accelerometers is only provided as an example; other implementations may use, for example, angular accelerometers.

Most fitting processes, nonlinear and otherwise, use a forward model, whether of simple gyro output or a much more complicated model, involving multiple layers of geology. This keeps the measurements (and their statistics) from getting complicated. Solving the "fast gyrocompass" explained above with reference to FIG. 1 is shown in matrix form as:

$$\begin{bmatrix} GO_{X\alpha} \\ GO_{YZ\alpha} \\ GO_{ZY\alpha} \\ GO_{X\beta} \\ GO_{YZ\beta} \\ GO_{ZY\beta} \end{bmatrix} = \begin{bmatrix} 1 & 0 & 0 & 1 & 0 & 0 \\ 0 & -1 & 0 & 0 & 1 & 0 \\ 0 & 0 & 1 & 0 & 0 & 1 \\ 0 & 1 & 0 & 1 & 0 & 0 \\ 0 & 0 & -1 & 0 & 1 & 0 \\ -1 & 0 & 0 & 0 & 0 & 1 \end{bmatrix} \begin{bmatrix} ER_X \\ ER_Y \\ ER_Z \\ Gbias_X \\ Gbias_{YZ} \\ Gbias_{ZY} \end{bmatrix}$$

Misalignments of the accelerometers and gyro input axes will make the above set of equations much more complicated. Assuming the gyro measurements have already been compensated for mass unbalance or other error terms in the particular gyro's model, and that the error terms are constant relative to the bias terms.

[$ER_X$, $ER_Y$, $ER_Z$], three components of the Earth rate, are not fully independent. Assuming inclination is known from a calculation based on the accelerometer measurements, and that $ER_H$ and $ER_V$ are already known, the following expressions may apply $$ER_{N''} = ER_H\cos(Az)\cos(I) - ER_V\sin(I)$$

$$ER_{E''} = -ER_H\sin(Az)$$

$$ER_X = ER_{N''}\cos(HTF) + ER_{E''}\sin(HTF)$$

$$ER_Y = ER_{E''}\cos(HTF) - ER_{N''}\sin(HTF)$$

$$ER_Z = ER_H\cos(Az)\sin(I) - ER_V\cos(I)$$

The foregoing partial results may be reduced to the sine and cosine of azimuth:

$$ER_{N''} = ER_x\cos(HTF) - ER_y\sin(HTF)$$

$$ER_{E''} = ER_y\cos(HTF) + ER_x\sin(HTF)$$

$$= -ER_H\sin(Az)$$

$$ER_H\cos(Az) = ER_{N''}\cos(I) - ER_z\sin(I)$$

Rather than a six-by-six set of equations and unknowns, a practical result is that there only four unknowns, but a very nonlinear (though overdetermined) relationship between azimuth and the rest of the parameter. Getting a result usually means the same as optimizing nonlinear equations, with an initial azimuth value from the [Gx, Gy, Gz] based solution set forth above. Optimizing depends on a series of local and incremental solutions to a set of equations:

$$\begin{bmatrix} GO_{X\alpha} - ER_X - Gbias_X \\ GO_{YZ\alpha} + ER_Y - Gbias_{YZ} \\ GO_{ZY\alpha} - ER_Z - Gbias_{ZY} \\ GO_{X\beta} - ER_Y - Gbias_X \\ GO_{YZ\beta} + ER_Z - Gbias_{YZ} \\ GO_{ZY\beta} - ER_X - Gbias_{ZY} \end{bmatrix} = \begin{bmatrix} \partial ER_X/\partial Az & 1 & 0 & 0 \\ -\partial ER_Y/\partial Az & 0 & 1 & 0 \\ \partial ER_Z/\partial Az & 0 & 0 & 1 \\ \partial ER_Y/\partial Az & 1 & 0 & 0 \\ -\partial ER_Z/\partial Az & 0 & 1 & 0 \\ -\partial ER_X/\partial Az & 0 & 0 & 1 \end{bmatrix} \begin{bmatrix} \Delta Az \\ \Delta Gbias_X \\ \Delta Gbias_{YZ} \\ \Delta Gbias_{ZY} \end{bmatrix}$$

in which $$\partial ER_{N''}/\partial Az = -ER_H\sin(Az)\cos(I)$$

$$\partial ER_{E''}/\partial Az = -ER_H\cos(Az)$$

$$\partial ER_x/\partial Az = \partial ER_{N''}/\partial Az\ \cos(HTF) + \sin(HTF)$$

$$\partial ER_y/\partial Az = \partial ER_{E''}/\partial Az\ \cos(HTF) - \sin(HTF)$$

$$\partial ER_z/\partial Az = -ER_H\sin(Az)\sin(I)$$

A good optimizer will expand the "local" solution to a larger step. It is also necessary to aggregate $ER_H$ with Az to scale that term to maximize the condition of the Jacobean matrix. In this way, more accurate values of Az may be determined.

Similar calculations and optimization may be performed on the accelerometer measurements. For purposes of the description following, the arrangement of accelerometers explained with reference to FIG. 1 and FIG. 2 may be used, with the addition of at least one accelerometer disposed on the frame (12 in FIG. 1). The following system of equations applies to the measurements from the accelerometers:

$$\begin{bmatrix} AO_{X_\alpha} \\ AO_{YZ_\alpha} \\ AO_{X_\alpha} \\ AO_{X_\alpha} \\ AO_{X_\alpha} \\ AO_{X_\alpha} \\ AO_{X_\alpha} \\ AO_{X_\alpha} \end{bmatrix} = \begin{bmatrix} 1 & 0 & 0 & 1 & 0 & 0 & 0 \\ 0 & -1 & 0 & 0 & 1 & 0 & 0 \\ 0 & 0 & 1 & 0 & 0 & 1 & 0 \\ 0 & 1 & 0 & 0 & 0 & 0 & 1 \\ 0 & 1 & 0 & 1 & 0 & 0 & 0 \\ 0 & 0 & -1 & 0 & 1 & 0 & 0 \\ -1 & 0 & 0 & 0 & 0 & 1 & 0 \\ -1 & 0 & 0 & 0 & 0 & 0 & 1 \end{bmatrix} \begin{bmatrix} g_x \\ g_y \\ g_z \\ Abias_X \\ Abias_{YZ} \\ Abias_{ZY} \\ Abias_Y \end{bmatrix}$$

wherein the respective accelerometer measurements are designated by AO, and the respective subscripts are the same as for the gyro measurements GO.

The local components of gravity [$g_x$, $g_y$, $g_z$] are the projections of gravity (=−gD, where D represents the local down direction). Once again is a linear system of equations for solving for the local gravity components and the accelerometer biases. It is overdetermined, so a least squares approach to a solution may be used. Even though the overall magnitude of gravity has a local variation in addition to what can be modeled using only latitude and altitude, the local variation in gravity (down) is often well-known. Equations for the three components of gravity are:

$$g_x = g\ \cos(HTF)\sin(I)$$

$$g_y = -g\ \sin(HTF)\sin(I)$$

$$g_z = -g\ \cos(I)$$

High side toolface (HTF) can be computed from the arc tangent of the ratio −gy/gz, unless inclination is near zero, while inclination (I) can be determined from the arc tangent of the ratio:

$$\left(g_x^2 + g_y^2\right)^{1/2}/g_z$$

Once again, one can construct a nonlinear set of equations in just high side toolface (HTF) and inclination (I), and solve these iteratively, either with an explicit optimizer or by a series of increments, in which the AO values represent output of respective accelerometers having input axes indicated by the associated subscript.:

In some embodiments, it is possible to embed the relationship $g=(g_x^2+g_y^2+g_z^2)^{1/2}$ in the original set of linear equations and continue solving for [$g_x$, $g_y$, $g_z$] using a nonlinear system of equations.

$$\begin{bmatrix} AO_{X\alpha} - g_X - Abias_X \\ AO_{YZ\alpha} + g_y - Abias_{YZ} \\ AO_{ZY\alpha} - g_z - Abias_{ZY} \\ AO_{Y\alpha} - g_y - Abias_Y \\ AO_{X\beta} - g_y - Abias_X \\ AO_{YZ\beta} - g_z - Abias_{YZ} \\ AO_{ZY\beta} - g_x - Abias_{ZY} \\ AO_{Y\beta} - g_x - Abias_Y \end{bmatrix} = \begin{bmatrix} \frac{\partial g_x}{\partial I} & \frac{\partial g_x}{\partial_{HTF}} & 1 & 0 & 0 & 0 \\ -\frac{\partial g_y}{\partial I} & \frac{\partial g_y}{\partial_{HTF}} & 0 & 1 & 0 & 0 \\ \frac{\partial g_z}{\partial I} & \frac{\partial g_z}{\partial_{HTF}} & 0 & 0 & 1 & 0 \\ \frac{\partial g_y}{\partial I} & \frac{\partial g_y}{\partial_{HTF}} & 0 & 0 & 0 & 1 \\ \frac{\partial g_x}{\partial I} & \frac{\partial g_x}{\partial_{HTF}} & 1 & 0 & 0 & 0 \\ \frac{\partial g_x}{\partial I} & \frac{\partial g_x}{\partial_{HTF}} & 0 & 1 & 0 & 0 \\ \frac{\partial g_x}{\partial I} & \frac{\partial g_x}{\partial_{HTF}} & 0 & 0 & 1 & 0 \\ \frac{\partial g_x}{\partial I} & \frac{\partial g_x}{\partial_{HTF}} & 0 & 0 & 0 & 1 \end{bmatrix} \begin{bmatrix} \Delta I \\ \Delta Tf_H \\ \Delta Abias_X \\ \Delta Abias_{YZ} \\ \Delta Abias_{ZY} \\ \Delta Abias_Y \end{bmatrix}$$

Similar to the explanation concerning the Jacobean matrix of the gyro measurements, the angle increments gΔAz and gΔHTF should be scaled in order to have the best condition number.

To determine azimuth using the foregoing method, however, it is important to make sure the tool is not being mechanically disturbed, then transition to a position-only measurement mode in which the frame (12 in FIGS. 1 and 2) is fixed relative to the tool housing. In some embodiments, the foregoing may be done by sending a command to the tool: the well or tool operator can determine that induced movement of the well tool has stopped, and a command signal may be issued to the tool to obtain gyro and accelerometer measurements as explained above. If the tool remains in inertial stabilization mode, meaning that the motor (36 in FIGS. 1 and 2) is commanded to rotate in response to induced tool movement-induced rotation of the frame (12 in FIGS. 1 and 2) possible residual rotation of the frame due to countering the Earth's rotation in the Z-axis direction may be difficult to do smoothly, especially when considering the foregoing over the lifetime of the tool and at elevated temperature. Angular acceleration from driving counter-rotation of the frame will disturb the gyro outputs, reducing their accuracy. A mode change out of inertial stabilization mode into fixed measurement mode also takes time, which may be costly to a well operator. In addition, when the frame is fixed, the tool will be susceptible to "angular shock" events and may not be able to resume attitude reference mode (continuous measurement of gyro and accelerometer outputs and associated calculation of tool orientation as the tool moves along a well). In a method according to the present disclosure, and referring to FIG. 3, rather than inertially stabilize the frame, it is possible to stabilize the frame against angular acceleration, using an angular accelerometer, and include the use of gravity, Earth rate, and/or magnetometer inputs to stabilize in more absolute terms. These additional inputs will help keep the frame fixed relative to the local frame, as an angular accelerometer will fail to detect a near-constant angular rate (meaning the frame is rotating by the angular acceleration is near or at zero. In some embodiments, the Z-axis angular rate as measured by the gyro may be used, if stripped of its Earth rate component:

$$ER_H\cos(Az)\sin(I) - ER_V\cos(I)$$

This constant relative to the local terrestrial frame is more absolute when the tool is no longer being moved. Up to such point, the outputs of the gyros and accelerometers are used to update the orientation of the tool as is ordinarily performed in attitude reference mode. After this point, the averaged values of the accelerometer and gyro outputs will be used to continually update the sensor biases (i.e., "drift tuning").

All sensors, including gyro and accelerometer measurements in the three principal directions, may be continually sampled. The sampling may be used to produce a time average as well as a nominal variance about that average for recently acquired data. A gimbal rotation rate adjustment may be continually computed to keep the cross-axis values of gyro, accelerometer, and outputs relatively the same. This rotation rate adjustment will need to be of limited magnitude: certainly, it will be bounded relative to inertial rotation rate.

When the variance about the average of the accelerometer and/or gyro data is below a threshold of nominal cultural noise, at 50 in FIG. 3, the tool will be determined to be at rest. A control law will change so as to reduce the net angular rate to zero in a reasonably brief period of time: one may use a rotary position sensor such as shown at 36A in FIG. 1 for this. Note that the tool is still able to resist angular shocks. After the frame is brought to zero angular rate, as shown at 52 in FIG. 3, and after a brief period of time for settling, measurement sample averages over a selected time window at 56 in FIG. 3, may also be stored for possible use as gyrocompass (calculation of tool and well orientation as explained above) inputs.

Figure 3:
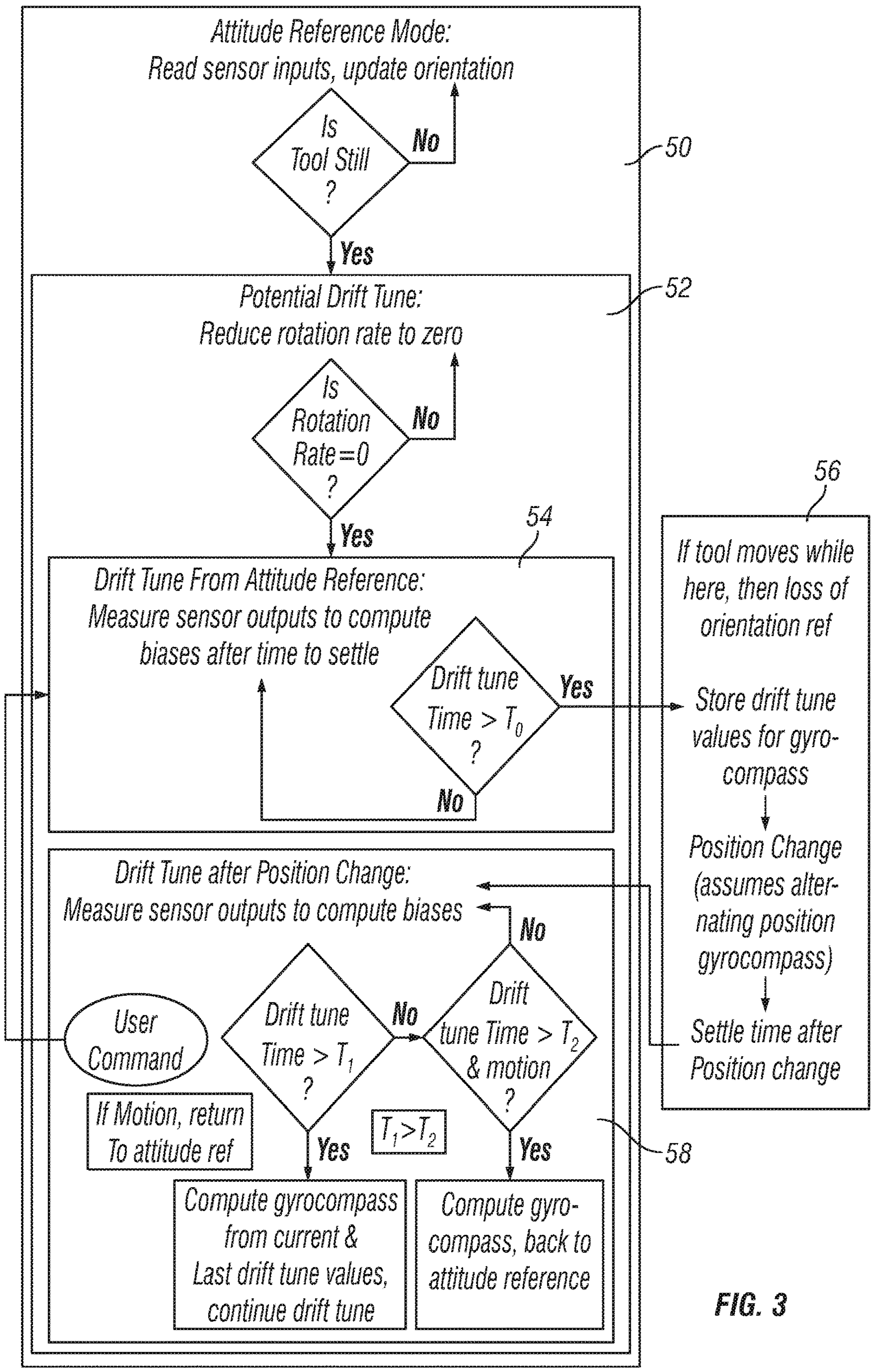
FIG. 3 is a flow chart of an example embodiment of a drift tuning procedure according to the present disclosure.

When the tool is still for a set minimum amount of time, at 54 in FIG. 3, a measurement sequence, including measurements, wherein the frame and rocker gimbals are in respective α and β positions as explained above with reference to FIG. 1 or 2 may be performed. After a predetermined amount of time, usually for the sensor outputs to settle yet again, the tool will resume sampling its sensors and storing values for possible use as a second set of gyrocompass inputs.

If the tool remains at rest for a minimum amount of time, the second set of sensor readings, at 58 in FIG. 3, will be used with the first set to compute a gyrocompass orientation. If the tool does not remain at rest for the minimum amount of time needed forest of gyrocompass measurements, it will use these "at rest" averages and its estimate of current orientation to update bias values in the sensor outputs only. After a maximum amount of time after the tool reorients internally (i.e., the frame and rocker gimbals are rotated) from alpha to beta measurement position as explained above, the tool will stop accumulating sensor output averages for a gyrocompass computation and perform the computation as explained above It will then wait in attitude reference mode, using the current value of current orientation and sensor output averages "at rest" to compute updated or "tuned" bias values.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A gyrocompass platform for surveying subsurface wells, comprising:

a frame rotatably mounted in a first gimbal, the first gimbal disposed in a housing adapted to traverse a subsurface well, an axis of rotation of the frame being parallel to a longitudinal axis of the housing;

a motor for rotating the frame with respect to the housing;

at least a first rocker gimbal rotatably mounted in the frame;

a motor for rotating the at least a first rocker gimbal with respect to the frame;

a second rocker gimbal rotatably mounted in the frame;

a motor for rotating the second rocker gimbal with respect to the frame;

gyroscopic sensors (gyros) mounted to the frame, to the at least a first rocker gimbal and to the second rocker gimbal, the gyros arranged to have input axes along each of three orthogonal directions, the frame being rotatable and the at least a first rocker gimbal being rotatable with reference to the frame to reorient the gyro input axes along opposed directions to the three orthogonal directions wherein a different gyro input axis is oriented along each opposed direction than a one of the gyros oriented along each orthogonal direction prior to rotation of the frame, the at least a first rocker gimbal and the second rocker gimbal;

wherein the gyros comprise three at least single input axis gyros, the at least a first and the second rocker gimbals each having a rotation axis in a plane of the frame and perpendicular to the axis of rotation of the frame;

the at least a first rocker gimbal and the second rocker gimbal are each rotatable only between a first position in the plane of the frame and a second position perpendicular to the plane of the frame; and at least one accelerometer associated with each one of the gyros for each orthogonal direction mounted to the frame and mounted to the at least a first rocker gimbal and the second rocker gimbal.

2. A gyrocompass platform for surveying subsurface wells, comprising:

a frame rotatably mounted in a first gimbal, the first gimbal disposed in a housing adapted to traverse a subsurface well, an axis of rotation of the frame being parallel to a longitudinal axis of the housing;

a motor for rotating the frame with respect to the housing;

at least a first rocker gimbal rotatably mounted in the frame;

a motor for rotating the at least a first rocker gimbal with respect to the frame;

a second rocker gimbal rotatably mounted in the frame;

a motor for rotating the second rocker gimbal with respect to the frame;

gyroscopic sensors (gyros) mounted to the frame, to the at least a first rocker gimbal and to the second rocker gimbal, the gyros arranged to have input axes along each of three orthogonal directions, the frame being rotatable and the at least a first rocker gimbal being rotatable with reference to the frame to reorient the gyro input axes along opposed directions to the three orthogonal directions wherein a different gyro input axis is oriented along each opposed direction than a one of the gyros oriented along each orthogonal direction prior to rotation of the frame, the at least a first rocker gimbal and the second rocker gimbal;

wherein the gyros comprise three at least single input axis gyros, a first of the at least single input axis gyros mounted to the frame, a second of the at least single input axis gyros mounted to the at least a first rocker gimbal and a third of the at least single input axis gyros mounted to a second rocker gimbal mounted in the frame and having a motor for rotating the second rocker gimbal, the at least a first and the second rocker gimbals each having a rotation axis in a plane of the frame and at an angle of 45 degrees with respect to the axis of rotation of the frame; and wherein the at least a first rocker gimbal and the second rocker gimbal are rotatable between a first position in a plane of the frame and a second position 180 degrees apart from the first position.

3. A gyrocompass platform for surveying subsurface wells, comprising:

a frame rotatably mounted in a first gimbal, the first gimbal disposed in a housing adapted to traverse a subsurface well, an axis of rotation of the frame being parallel to a longitudinal axis of the housing;

a motor for rotating the frame with respect to the housing;

at least a first rocker gimbal rotatably mounted in the frame;

a motor for rotating the at least a first rocker gimbal with respect to the frame;

a second rocker gimbal rotatably mounted in the frame;

a motor for rotating the second rocker gimbal with respect to the frame;

gyroscopic sensors (gyros) mounted to any two of the frame, the at least a first rocker gimbal and the second rocker gimbal, the gyros arranged to have input axes along each of three orthogonal directions, the frame being rotatable and the at least a first rocker gimbal being rotatable with reference to the frame to reorient the gyro input axes along opposed directions to the three orthogonal directions wherein a different gyro input axis is oriented along each opposed direction than a one of the gyros oriented along each orthogonal direction prior to rotation of the frame, the at least a first rocker gimbal and the second rocker gimbal; and wherein an axis of rotation each of the at least a first rocker gimbal and the second rocker gimbal are oriented at an angle of 45 degrees to the axis of rotation of the frame and wherein the at least a first rocker gimbal and the second rocker gimbal are rotatable between a first position in a plane of the frame and a second position 180 degrees apart from the first position.

4. The platform of claim 3 wherein gyros comprise a single input axis gyro mounted in the at least a first rocker gimbal and a dual input axis gyro is mounted in the second rocker gimbal.

5. The platform of claim 1 further comprising four additional accelerometers mounted to the frame in left-right-up-down configuration, wherein measurements from the four additional accelerometers are used either or both to correct measurements from the gyros for angular acceleration in the platform and to stabilize the platform.

6. A method for gyrocompass surveying a subsurface well, comprising:

moving a gyrocompass sensor to a survey position along the well, the gyrocompass sensor comprising gyroscopic sensors (gyros) having input axes along three mutually orthogonal directions and accelerometers having input axes along the three mutually orthogonal directions;

measuring output of the gyros and output of the accelerometers;

rotating the gyros such that the input axes of the gyros are oriented along opposed directions to the three mutually orthogonal directions wherein a different gyro input axis is oriented along each opposed direction than the gyro input axis oriented along each of the three mutually orthogonal directions prior to rotation;

repeating measuring output of the gyros;

determining at least a geodetic azimuth of the gyrocompass sensor using the measured gyro output, the repeated measured gyro output and the measured output of the accelerometers, the geodetic azimuth corrected for gyro bias; and wherein the gyros comprise three at least single input axis gyros, a first of the at least single input axis gyros mounted to a frame rotatably supported in a housing, a second of the at least single input axis gyros mounted to at least a first rocker gimbal mounted in the frame and having a motor for rotating the at least a first rocker gimbal at most 90 degrees, and a third of the at least single input axis gyros mounted to a second rocker gimbal mounted in the frame and having a motor for rotating the second rocker gimbal at most 90 degrees, the first and second rocker gimbals each having a rotation axis in a plane of the frame and perpendicular to an axis of rotation of the frame, and wherein the rotating the gyros comprises rotating each of the frame, the at least a first rocker gimbal and the second rocker gimbal by 90 degrees from the plane of the frame to perpendicular to the frame.

7. A method for gyrocompass surveying a subsurface well, comprising:

moving a gyrocompass sensor to a survey position along the well, the gyrocompass sensor comprising gyroscopic sensors (gyros) having input axes along three mutually orthogonal directions and accelerometers having input axes along the three mutually orthogonal directions;

measuring output of the gyros and output of the accelerometers;

rotating the gyros such that the input axes of the gyros are oriented along opposed directions to the three mutually orthogonal directions wherein a different gyro input axis is oriented along each opposed direction than the gyro input axis oriented along each of the three mutually orthogonal directions prior to rotation;

repeating measuring output of the gyros;

determining at least a geodetic azimuth of the gyrocompass sensor using the measured gyro output, the repeated measured gyro output and the measured output of the accelerometers, the geodetic azimuth corrected for gyro bias; and wherein the gyros comprise either (i) three at least single input axis gyros, a first of the at least single input axis gyros mounted to a frame rotatably supported in a housing, a second of the at least single input axis gyros mounted to at least a first rocker gimbal rotatably mounted in the frame and having a motor for rotating the at least a first rocker gimbal, and a third of the at least single input axis gyros mounted to a second rocker gimbal rotatably mounted in the frame and having a motor for rotating the second rocker gimbal, the at least a first and the second rocker gimbals each having a rotation axis in a plane of the frame, and at an angle of 45 degrees to an axis of rotation of the frame and wherein the rotating comprises rotating each of the at least a first rocker gimbal and the second rocker gimbal by 180 degrees, (ii) one at least single input axis gyro and one at least dual input axis gyro, the at least single input axis gyro mounted to the frame and the at least dual input axis gyro mounted to the at least a first rocker gimbal; or (iii) the at least single input axis gyro is mounted in the at least a first rocker gimbal and the at least dual input axis gyro is mounted in a second rocker gimbal rotatably mounted in the frame and having a motor for rotating the second rocker gimbal.

8. The method of claim 6 further comprising measuring acceleration in an accelerometer frame mounted to an instrument housing containing the gyrocompass sensor, the measuring acceleration performed in in left-right-up-down configuration, wherein measurements of acceleration in the accelerometer frame are used to correct measurements from the gyros for angular acceleration in the gyrocompass sensor.

9. A method for drift tuning a gyroscopic survey instrument, comprising:

measuring output of gyroscopic sensors and accelerometers in the instrument as the instrument is moved along a wellbore;

determining an attitude of the instrument as the instrument is moved along the wellbore using the outputs;

stopping the instrument in the wellbore;

determining that a platform comprising the gyroscopic sensors and accelerometers in the instrument has stopped moving;

measuring output of the gyroscopic sensors to determine a first bias and drift therein;

reorienting the gyroscopic sensors;

again measuring output of the gyroscopic sensors to determine a second bias and drift therein;

determining a geodetic orientation of the survey instrument using the gyroscopic sensor outputs before and after reorienting the gyroscopic sensors; and using the geodetic orientation to refine the first and second determined biases and drifts.

10. The method of claim 9 wherein the determining the platform has stopped moving comprises measuring angular acceleration of the platform.

11. The method of claim 9 wherein the determining the platform has stopped moving comprises stopping motion of a motor used to rotate a frame in the platform about a longitudinal axis of the instrument.

12. The method of claim 7 further comprising measuring acceleration in an accelerometer frame mounted to an instrument housing containing the gyrocompass sensor, the measuring acceleration performed in in left-right-up-down configuration, wherein measurements of acceleration in the accelerometer frame are used to correct measurements from the gyros for angular acceleration in the gyrocompass sensor.

13. A method for gyrocompass surveying a subsurface well, comprising:

moving a gyrocompass sensor to a survey position along the well, the gyrocompass sensor comprising gyroscopic sensors (gyros) having input axes along three mutually orthogonal directions and accelerometers having input axes along the three mutually orthogonal directions;

measuring output of the gyros and output of the accelerometers;

rotating the gyros such that the input axes of the gyros are oriented along opposed directions to the three mutually orthogonal directions wherein a different gyro input axis is oriented along each opposed direction than the gyro input axis oriented along each of the three mutually orthogonal directions prior to rotation;

repeating measuring output of the gyros;

determining at least a geodetic azimuth of the gyrocompass sensor using the measured gyro output, the repeated measured gyro output and the measured output of the accelerometers, the geodetic azimuth corrected for gyro bias; and measuring acceleration in an accelerometer frame mounted to an instrument housing containing the gyrocompass sensor, the measuring acceleration performed in in left-right-up-down configuration, wherein measurements of acceleration in the accelerometer frame are used to correct measurements from the gyros for angular acceleration in the platform gyrocompass sensor.

14. The platform of claim 2 further comprising four additional accelerometers mounted to the frame in left-right-up-down configuration, wherein measurements from the four additional accelerometers are used either or both to correct measurements from the gyros for angular acceleration in the platform and to stabilize the platform.

15. The platform of claim 3 further comprising four additional accelerometers mounted to the frame in left-right-up-down configuration, wherein measurements from the four additional accelerometers are used either or both to correct measurements from the gyros for angular acceleration in the platform and to stabilize the platform.

16. The method of claim 7 further comprising measuring acceleration in an accelerometer frame mounted to an instrument housing containing the gyrocompass sensor, the measuring acceleration performed in in left-right-up-down configuration, wherein measurements of acceleration in the accelerometer frame are used to correct measurements from the gyros for angular acceleration in the gyrocompass sensor.

* * * * *